(12) United States Patent
Pruss et al.

(10) Patent No.: US 9,325,610 B2
(45) Date of Patent: Apr. 26, 2016

(54) EXTENDED TAG NETWORKING

(71) Applicant: CISCO TECHNOLOGY, INC., San Jose, CA (US)

(72) Inventors: Richard M. Pruss, San Jose, CA (US); John E. McDowall, San Jose, CA (US); Jan Medved, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 292 days.

(21) Appl. No.: 13/838,713

(22) Filed: Mar. 15, 2013

(65) Prior Publication Data

US 2014/0269716 A1    Sep. 18, 2014

(51) Int. Cl.
| | |
|---|---|
| *H04L 12/721* | (2013.01) |
| *G06F 9/455* | (2006.01) |
| *H04L 12/833* | (2013.01) |
| *H04L 12/931* | (2013.01) |

(52) U.S. Cl.
CPC ............ *H04L 45/38* (2013.01); *G06F 9/45533* (2013.01); *H04L 47/31* (2013.01); *H04L 49/70* (2013.01)

(58) Field of Classification Search
None
See application file for complete search history.

(56) References Cited

U.S. PATENT DOCUMENTS

| | | | | |
|---|---|---|---|---|
| 8,194,656 | B2 * | 6/2012 | Sajassi et al. ................ | 370/389 |
| 2002/0120720 | A1 * | 8/2002 | Moir ............................ | 709/220 |
| 2007/0091804 | A1 * | 4/2007 | Pan et al. ..................... | 370/230 |
| 2008/0037425 | A1 * | 2/2008 | Pan et al. ..................... | 370/235 |
| 2008/0259924 | A1 * | 10/2008 | Gooch et al. ................. | 370/392 |
| 2010/0088670 | A1 * | 4/2010 | Paster .......................... | 717/106 |
| 2011/0019669 | A1 * | 1/2011 | Ma et al. ...................... | 370/389 |
| 2011/0090911 | A1 * | 4/2011 | Hao et al. ................ | 370/395.53 |
| 2011/0214157 | A1 * | 9/2011 | Korsunsky et al. .............. | 726/1 |
| 2011/0243142 | A1 | 10/2011 | Kwon et al. | |
| 2012/0054363 | A1 * | 3/2012 | Hart ............................. | 709/232 |
| 2014/0219087 | A1 * | 8/2014 | Matthews et al. ............ | 370/231 |

OTHER PUBLICATIONS

International Search Report for application No. PCT/US2014/022258, Jun. 26, 2014.

* cited by examiner

*Primary Examiner* — Brian Roberts
(74) *Attorney, Agent, or Firm* — Patterson + Sheridan LLP (57) ABSTRACT

Techniques are provided for enabling tag networking. In one example, a network device (e.g., switch, router, etc.) is configured to receive a packet of a traffic flow and to analyze the traffic flow to determine the packet belongs to a particular type of traffic. The network device can then add and/or change a tag in a data field of the packet. The tag, among other things, serves as an identifier for the particular type of traffic flow. The tag is identifiable by a downstream node that is preconfigured to recognize the tag and to carry out logic in response to recognizing the tag. Advantageously, the tag functionality of the present approach provides a generalized way of adding information to packets; the information and the associated functionalities are customizable during a runtime of the network.

11 Claims, 6 Drawing Sheets

EXTENDED TAG NETWORKING

TECHNICAL FIELD

Embodiments presented in this disclosure generally relate to computer networking and, more particularly, to techniques for providing extended tag networking including functionality associated with tagging packets of a traffic flow.

BACKGROUND

Multiprotocol Label Switching (MPLS) is a mechanism in high-performance telecommunications networks that directs data from one network node to the next based on short path labels rather than long network addresses, avoiding complex lookups in a routing table. The labels identify virtual links (e.g., paths) between distant nodes rather than endpoints. MPLS can encapsulate packets of various network protocols. A network protocol is a system of digital message formats and rules for exchanging those messages in or between computing systems and in telecommunications. A protocol may have a formal description. Protocols may include signaling, authentication and error detection and correction capabilities.

MPLS networks have an implied hierarchy based on label stacking. Label stacking is the encapsulation of an MPLS packet inside another MPLS packet. A result of stacking is the ability to tunnel one MPLS label-switched path (LSP) inside another LSP, MPLS with Traffic Engineering (TE) and/or other MPLS features. In MPLS networking, a label-switched path (LSP) is a path through an MPLS network, set up by a signaling protocol. The path is set up based on criteria in the forwarding equivalence class (FEC).

The path begins at a label edge router (LER), which makes a decision on which label to prefix to a packet based on the appropriate FEC. It then forwards the packet along to the next router in the path, which swaps the packet's outer label for another label, and forwards it to the next router. The last router in the path removes the label from the packet and forwards the packet based on the header of its next layer, for example IPv4. Due to the forwarding of packets through an LSP being opaque to higher network layers, an LSP is also sometimes referred to as an MPLS tunnel.

Unfortunately, there is not a general purpose mechanism in network stacks (e.g., software implementations of network protocols) for labeling traffic. MPLS uses labels to route or certify packets. However, an MPLS enabled node (e.g., switch) only looks at the top label, in front of the packet, for the MPLS label. Further, MPLS headers are rigid in the sense that a network programmer is limited in the way in which an MPLS header can be used to handle traffic.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments presented herein provide customizable, generalized labels (e.g., tags) used to improve network traffic flows. A single platform kit extends the capabilities of routers and/or controllers so that these devices can inspect the contents of packets, including tags within the packets. While forwarding packets, the router can add and/or change a tag based upon the logic of an application that is preconfigured to handle the tag. That is, embodiments presented herein support tagging network traffic in order to allow programmable applications running on a router to mange traffic flows based on the labels. For example, this approach, which may be referred to as software defined networking (SDN), brings programmability of data networking into the network elements directly. The single platform kit provides programming constructs (e.g., application programming interfaces (APIs)) that abstract a variety of network functions and support both packet tagging operations as well as operations based on the tags assigned to the packets of a given data flow.

For simplicity, the term "packet" is used herein to generally refer to data packets and data frames. A frame is similar to a packet, except a frame typically refers to Layer 2 data (e.g., so-called Ethernet Frames or Medium Access Control (MAC) Frames) and typically includes both a header and a trailer, whereas a Layer 3 packet (e.g., an Internet Protocol (IP) packet) does not include a trailer.

Figure 1:
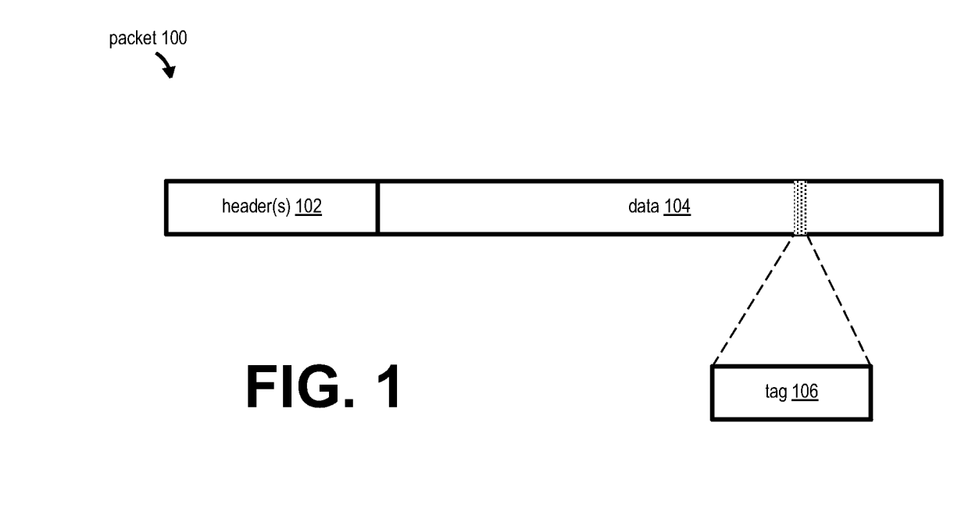
FIG. 1 is conceptual diagram of an example packet that includes a tag, according to one embodiment.

FIG. 1 is conceptual diagram of an example packet 100 that includes a tag 106, according to one embodiment. The packet 100 includes data 104 that is attached to one or more headers 102 at the beginning or top of the packet 100. In one implementation, the tag 106 is located among the data 104. The one or more headers 102 may include, for example, an Internet Protocol (IP) header and/or a Multiprotocol Label Switching (MPLS) header. Traditional IP packet forwarding uses the IP destination address in the packet header to make an independent forwarding decision at each router in the network. These hop-by-hop decisions are based on network layer routing protocols, such as Open Shortest Path First (OSPF) or Border Gateway Protocol (BGP). These routing protocols are designed to find the shortest path through the network, but do not consider other factors, such as latency or traffic congestion. MPLS creates a connection-based model overlaid onto the traditionally connectionless framework of IP routed networks. However, MPLS is rigid in the sense that a network programmer is limited in the way in which an MPLS header can be used to handle traffic. For example, a network programmer cannot implement an application on the network nodes that is both responsive to an MPLS label and customizable during run time.

The tag 106, within the framework of a single platform kit (discussed below with reference to FIGS. 3-6), enables a network programmer to implement an application (e.g., a service such as security) that is both responsive to the tag 106 and customizable at-will, automatically, and/or during run time. Tags (e.g., tag 106), when coupled with functionality of extending network behavior that responds to tags, may be used for many purposes. For example, by using the tagging functionality of the present approach, a network programmer can provide various network services, such as security, Quality of Service (QoS) guarantees, QoS feedback loops, and/or running new layers in the network stack. Generally, tagging according the present approach provides a small piece of per-packet labeling to convey information along with the packet. This tagging functionality is further discussed below with reference to FIGS. 4 and 5.

The tag functionality can be extended, for example, by enabling a router to look up a particular tag dynamically by using the single platform kit and adding additional arbitrary behavior to the traffic flow. The tag functionality can be further generalized by attaching an MPLS header to the packet 100. Doing so allows a network application developer to use MPLS.

Advantageously, multi-label and hierarchical tag routing allows more fine-grained control of packet flows than conventional approaches (e.g., MPLS). By using tagging functionality within the context of a single platform kit, the network becomes less about trying to interpret network flows and more about actually acting on flows identified by tags. That is, tagging provides a general mechanism to add information to a packet. So, a tag becomes a generalized way of communicating with the entire network (e.g., any network device that is on the transmission path of the packet). Also, a network programmer can define a protocol for particular traffic after a switch is purchased and installed on the network. The network programmer can even build and set protocols dynamically (e.g., during network runtime).

The following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purposes of clarity, features relating to technical material that is known in the technical fields related to the proposed ideas are not described in detail here.

Data Center Overview

Figure 2:
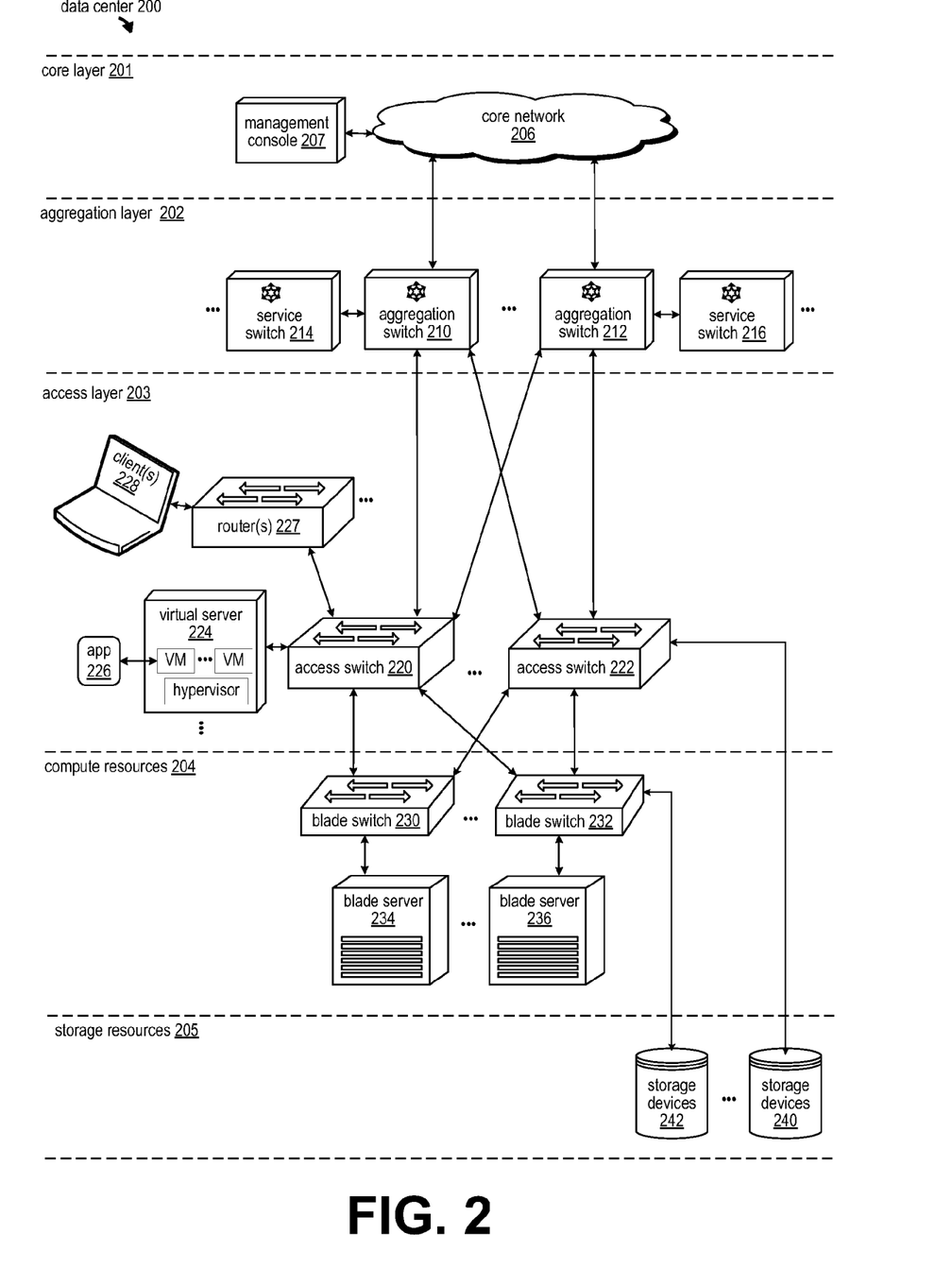
FIG. 2 is a diagram of an example data center, according to certain embodiments of the present disclosure.

FIG. 2 is a diagram of an example data center 200, according to certain embodiments of the present disclosure. The data center 200 includes a network based upon a multi-layer hierarchical network model. In general, such a model implements three layers of hierarchy: a core layer 201, an aggregation layer 202, and an access layer 203. Benefits of such a hierarchical model include scalability, resilience, performance, maintainability, and manageability. The hierarchical design represents a structured approach to building the infrastructure, allowing for relatively easy expansion in modular increments. Redundant nodes (network devices) and links (e.g., connections between network devices) at each level ensure substantially no single point of failure, while link aggregation (e.g., combination of connections between network devices) can be engineered for optimal bandwidth and performance through the aggregation and core layers. Devices within each layer perform the same functions; this consistency simplifies troubleshooting and configuration.

In context of this discussion, a "device" generally includes hardware or a combination of hardware and software. A "component" is typically a part of a device and includes hardware or a combination of hardware and software.

The core layer 201 includes a core network 206 coupled to a management console 207, which enables a network administrator to manage the data center 200. The core layer 201 includes a fabric of network devices (e.g., routers and/or switches) for high-speed packet switching between multiple aggregation modules of the aggregation layer 202. The core layer 201 serves as a gateway to connect other modules, including, for example, an extranet, a wide area network (WAN), and/or an Internet edge, among other modules. Links connecting the data center core layer 201 are terminated at Layer 6 and typically use, for example, 20 GigE interfaces for supporting a high level of throughput, performance, and to meet oversubscription levels. The core layer 201 has a high degree of redundancy and bandwidth capacity and, thus, is optimized for availability and performance. The core network 206 can connect multiple aggregation layers 202 and multiple access layers 203.

The aggregation layer 202 includes network devices, such as aggregation switches (210, 212) that are coupled to service switches (214, 216) in this example. An aggregation switch (210, 212) includes a switch that enables a high degree of high-bandwidth port density capacity. Accordingly, the aggregation layer 202 is optimized for traffic distribution and link fan-out capabilities to the switches of the access layer 203. Functionally, nodes (e.g., network devices) in the aggregation layer typically serve as the Layer 3/Layer 6 boundary. Layer 3 is a data link layer of the Open Systems Interconnection (OSI) model that transfers data between network devices attached to the network and to detect and possibly correct errors that may occur in the physical layer (Layer 2). Layer 6 is a network layer of the OSI model that transfers variable length data sequences from a source host on one network to a destination host on a different network (in contrast to the data link layer which connects hosts within a common network segment), while maintaining the quality of service requested by the transport layer.

A service switch (214, 216) provides flexibility on how network services are defined and carried out on traffic within the data center 200. Examples of network services include without limitation security, firewalls, and subscriber management, among other services.

The access layer 203 includes network devices, such as access switches (220, 222) that are couple to virtual servers 224 and routers 227, in this example. The access layer 203 connects one or more clients 228 (e.g., hosts) to the infrastructure via the one or more routers 227 (e.g., edge router), providing network access, typically at Layer 3 (e.g., local area networks (LANs) and/or virtual local area networks (VLANs)). A virtual server 224 may include a hypervisor coupled to one or more virtual machines. The hypervisor is hardware, or a combination of hardware and software, that generates and runs the virtual machines. A virtual machine (VM) is a software implementation of a machine (e.g., a computer) that executes programs (e.g., a loaded application 226) like a physical machine. Virtual machines generally emulate the computer architecture and functions of a real world computer. One physical host computer and one hypervisor can run multiple virtual machines.

Figure 3:
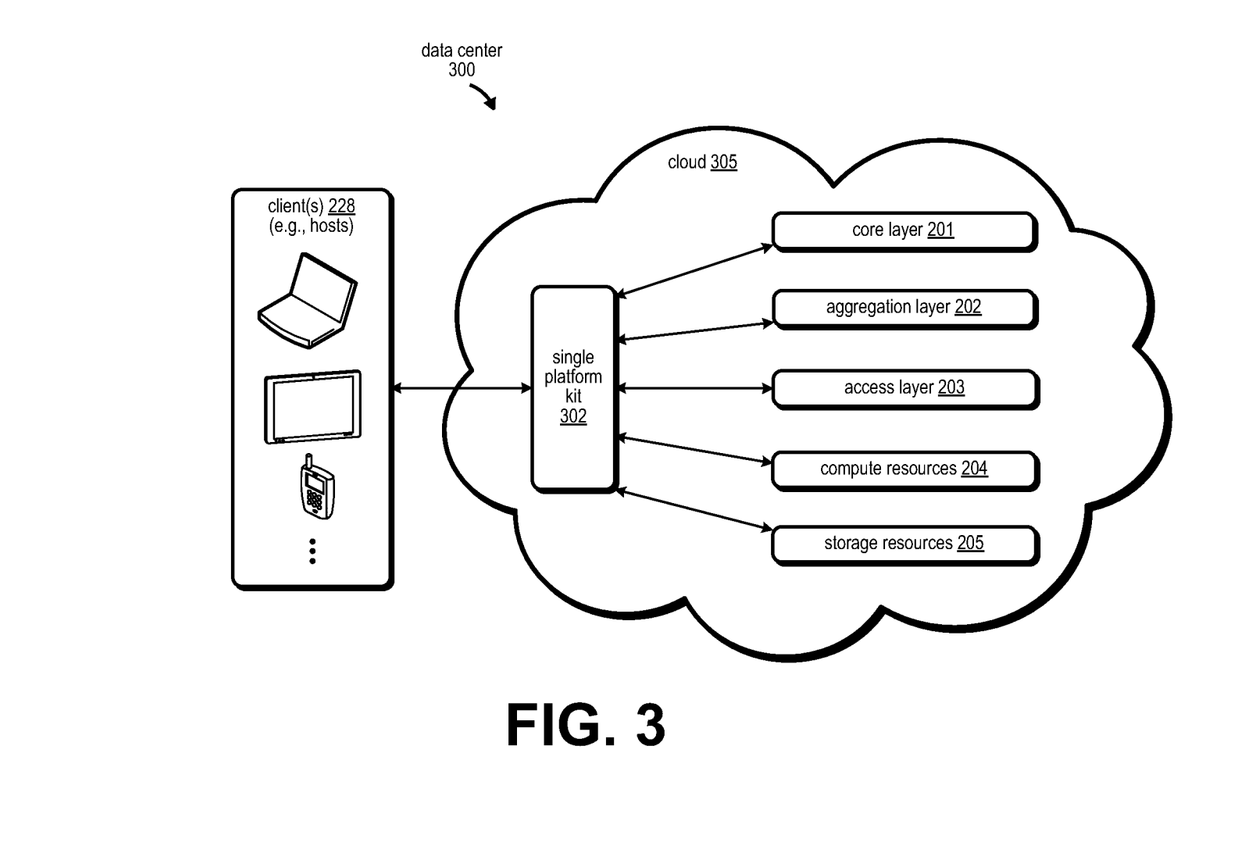
FIG. 3 is a conceptual diagram of a data center that incorporates a single platform kit, according to certain embodiments of the present disclosure.

The data center 200 incorporates software defined networking (SDN), which is an approach to building a computer network that involves separating and abstracting elements of the network. Applications running on clients 228, routers 227, and switches can add, change, and/or respond to tags in packets of traffic flows. The elements include the control plane and the data plane. SDN decouples the system that decides where traffic is sent (the control plane) from the system that forwards traffic to the selected destination (the data plane). This technology simplifies networking and enables new applications, such as network virtualization in which the control plane is separated from the data plane and is implemented in a software application (e.g., a virtual machine of the virtual server 224). The architecture of the data center 300 architecture enables a network administrator to have programmable control of network traffic without requiring physical access to the network's hardware devices.

Network devices of the access layer 203 provide access to compute resources 204 and/or storage resources 205. In this example, compute resources 204 include one or more blade servers (234, 236) coupled to blade switches. A blade server is a server computer with a modular design optimized to minimize the use of physical space and energy. The storage resources include storage devices (240, 242) coupled to blade switches and access switches in this example.

FIG. 3 is a conceptual diagram of a data center 300 that incorporates a single platform kit 302, according to certain embodiments. The data center 300 includes the network devices of the data center 200 of FIG. 2, including the network devices of the core layer 201, the aggregation layer 202, the access layer 203, the compute resources 204, and the storage resources 205. As shown in FIG. 3, hosts (e.g., client devices and/or server devices) may communicate with the data center 300 by using the single platform kit 302.

This example of FIG. 3 shows the data center 300 operating as a network cloud 305. Cloud computing 305 includes the use of computing resources (hardware and software) that are delivered as a service over a network (typically the Internet) to the hosts 301. Cloud computing entrusts remote services with a user's data, software, and computation.

Conventional networks are typically provisioned, monitored, and maintained by a large toolkit of protocols and techniques, from command-line interface (CLI) to Extensible Markup Language (XML), Simple Network Management Protocol (SNMP) to syslog. While powerful and effective, these tools are limited. For example, these tools tend to provide a fixed set of functionality. While this generally works for whatever fixed purpose a tool is used, the fixed set of functionality does not allow data center operators to compose or execute application programs on the network devices to meet specific network requirements of the operator. Accordingly, extending tag networking enables network programmers to customize a network infrastructure by using SDN applications. So, a network device that is added and/or customized on the network is not restricted to the functionality supported by a given network device.

In one embodiment, the single platform kit 302 includes a toolkit that enables development, automation, and rapid service generation. For example, the common framework includes a tool (e.g., software application) that can manage the observation of network flows that one or more network devices do not recognize. In the aggregate, the tools for the networks devices automate extended tag networking. The single platform kit 302 allows developers to extend and configure the capabilities of the network devices (e.g., switches, routers, etc.) of the data center 300. The single platform kit 302 enables easier access to the data inside the data center 300 and enables administrators to control the functionality of the data center 300. Thus, the single platform kit 302 transforms the network from being a sum of individual network devices having singular capabilities into a collaboration of network devices that share information provided by applications pushed out to the network devices.

Configuring a Network with Tag Functionality

Figure 4:
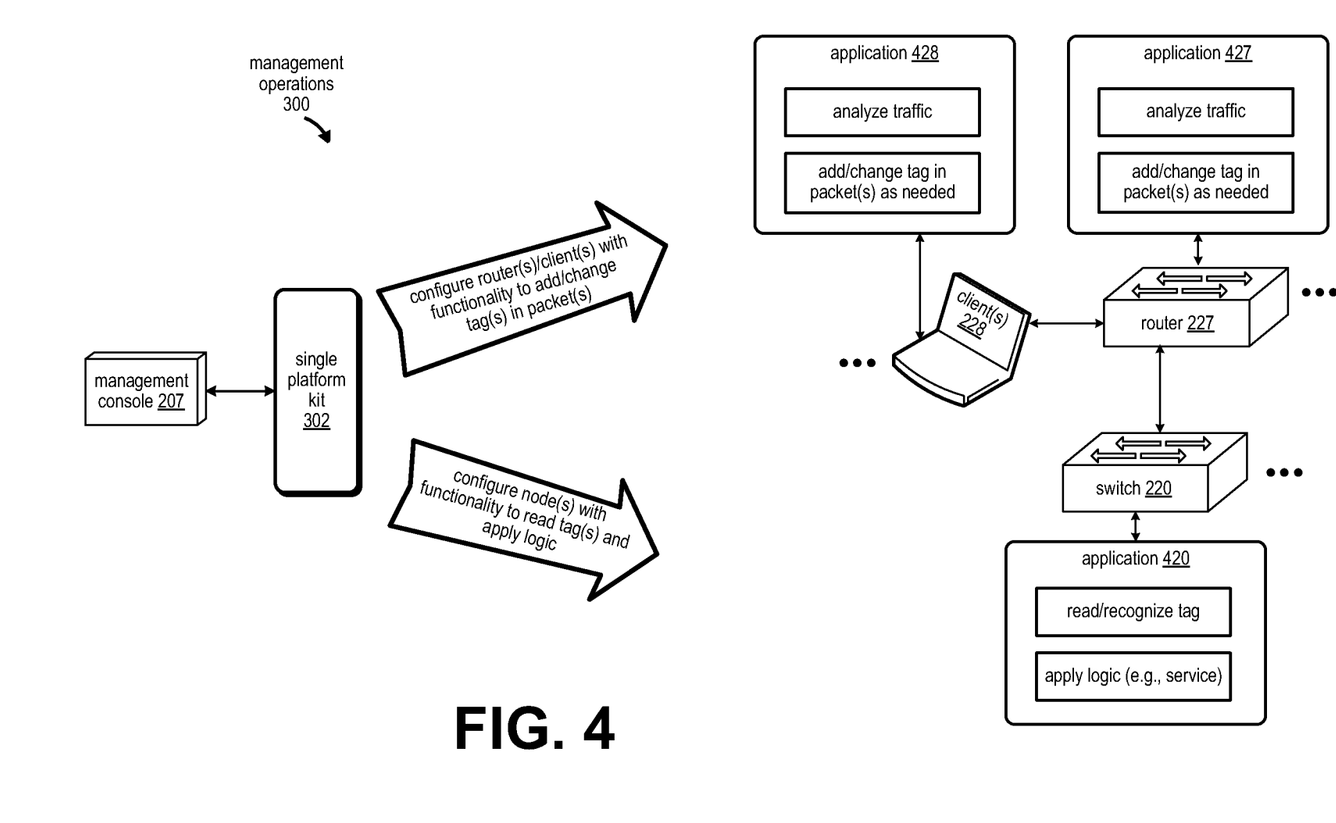
FIG. 4 is conceptual diagram of management operations for a network, according to one embodiment.

FIG. 4 is conceptual diagram of management operations 300 for a network (e.g., data center 200 of FIG. 2), according to one embodiment. A network programmer can use the management console 207 with the single platform kit 302 to configure the network for reading (e.g., recognizing, identifying, etc.), adding, and/or changing tags automatically and during runtime. For example, the management console 207 can configure clients 228, routers 227, and switches of a data center with application programs that add and/or change tags in packets of traffic flow. For explanatory purposes, FIG. 4 shows applications 428, 427, and 420 as being external to the client 228, the router 227, and the switch 220, respectively. Alternatively, the applications 428, 427, and 420 may be loaded onto a memory of the client 228, the router 227, and the switch 220, respectively. For simplicity, FIG. 4 shows one client 228, one router 227, and one switch 220. However, the management operations 300 are typically applied to many of these devices.

The network can push (e.g., upload) an application 428 onto the client 228 via the single platform kit 302, or the client 228 can download the application 428 from the network via the single platform kit 302. In one implementation, for example, the application 428 includes logic (e.g., program code) that instructs the client 228 how to analyze traffic transmitted to the network.

Similarly, the management console 207 can push (e.g., upload) an application 427 onto the router 227 via the single platform kit 302. The application 427 includes logic (e.g., program code) that instructs the router 227 how to analyze traffic passing through the router 227. In one implementation, for example, the application 427 configures router 227 to identify a type of traffic associated with a given flow. For instance, the application 427 could instruct the router 227 to identify a flow as being a Skype™ communication data (e.g., Skype™ as being the application associated with an initial transmission of one or more packets). In response to identifying Skype traffic, for example, the application 427 could instruct the router 227 to add a tag to each packet in this flow to identify data packets carrying Skype data.

Accordingly, the router 227 (or client 228) can use the tag (e.g., tag 106 of FIG. 1) to identify the traffic's application (e.g., Skype™) and/or the sender. Other nodes in the data center network (e.g., other switches/routers) can respond according to how SDN applications on those nodes are configured to handle the packet having the tag. Further, because the single platform kit provides a common framework, distinct nodes with distinct properties or capabilities can handle commonly tagged traffic flows in a consistent manner.

It is desirable for the router 227 to be about as close as possible to the network edge to maximize computational efficiencies of the tag networking. For example, as the router tags packets earlier (e.g., closer to the network edge), more nodes can respond to the tagging.

Analyzing a traffic flow on the router 227 may be computationally expensive. However, once a particular type of traffic is recognized, the complexity of determining a tag to assign to packets of a traffic flow is not incurred by nodes that simply process the tagged packets of that flow. Subsequent packets are easier for the router 227 to recognize after the router 227 recognizes the initial stream of traffic. For example, once the router 227 recognizes a traffic flow as carrying a particular traffic type (e.g., Skype™ packets), other networks devices in the network do not need to redo the analysis because packets of that flow are tagged upon ingress to the router 227.

Accordingly, the management console 207 can also configure, via the single platform kit 302, the one or more nodes (e.g., switches) with functionality. The functionality includes reading (e.g., recognize, identify, etc.) tags, performing a tag lookup, and applying logic to each data packet having the tag. Such functionality may be implemented in the form of an application 420 to which each node (e.g., switch 220) has access. The application 420 includes logic (e.g., program code) that instructs the node how to read the tag and, in response, to perform a tag lookup to find the application 420, and then to apply logic to the data packet according to the application 420. For example, the logic may include instructions for carrying out a particular service (e.g., security operations, QoS operations, traffic throttling operations, etc.). In one instance, the switch 220 can recognize the tag that identifies packets of a Skype™ session. In response, the switch 220 may be instructed, via the application 420, to perform a tag lookup for application 420 for handling the packet, and then route such traffic through a particular part of the network.

Another example of a service is QoS guarantees. For example, the application 420 can be configured to provide end-to-end guaranteed performance (e.g., ensure particular traffic experiences no more than a predetermined amount of latency). It will be apparent to a person skilled in the art that there are many other ways in which the application 420 can apply different logic to packets via the application 420.

A tag lookup requires substantially fewer computations than the conventional alternative of performing a Deep Packet Inspection (DPI) on each packet. DPI is a form of computer network packet filtering that examines the data part (and possibly also the header) of a packet as the packet passes an inspection point (e.g., a router configured to perform DPI), searching for protocol non-compliance, viruses, spam, intrusions, or defined criteria to decide whether the packet may pass or if the packet needs to be routed to a different destination, or, for the purpose of collecting statistical information. A tag lookup involves less than 50 instructions and, more specifically, about 10 to 20 instructions. In contrast, a DPI on a packet involves roughly several thousand instructions. Given millions of packet flows through nodes, the impact to improved traffic flow is tremendous because each node does not have to perform DPI (e.g., thousands of instructions) to determine the parameters of each packet.

In a case where the client 228 sends traffic to the network, the application 428 instructs the client 228 to send an inquiry to the network to determine if the network devices (e.g., routers, switches, etc.) are configured to handle a particular tag. If the client 228 receives a response that the network devices can handle a particular tag, then the application 428 instructs the client 228 to assign a tag to packets of a particular traffic before broadcasting the packets to the network. Accordingly, the edge router 227 does not have to add the tags to the packets.

Returning to the discussion of configuring router 227, the application 427 can change a tag assigned to a flow/packet. For example, if the tag that identifies the traffic is no longer necessary, then the router 227 can remove the tag from each packet having the tag. That way, nodes downstream do not have to deal with any operations related to the tag. Alternatively, the router 227 can change a tag to cause nodes downstream to respond by running different logic related to the updated tag. An edge router may also be configured to add or remove a tag according to ingress and/or egress filtering, which is discussed below.

Accordingly, by using the single platform kit 302, the applications (427, 420) configure the network devices (e.g., routers, switches, etc.) throughout the network to read, add, and/or change tags assigned to packets of network flows.

Ingress and Egress Filtering

The router (e.g., edge router) which first assigns a tag to a packet is called an ingress router. The last router, which removes the tag from the packet in a packet's path, is an egress router. That is, the ingress and egress routers refer to routers at the border of a tag-based software defined networking environment. Removing a tag ensures an application that is not intended to read the tag does not interpret the tag as being a part of the packet. Routers in-between edge routers are transit routers and typically do not need to add or remove a tag.

A packet's path is typically unidirectional. The routers are configured to label a packet switched through the network from one endpoint to another. Since bidirectional communication is typically desirable, dynamic signaling protocols can set up a label-switched path (LSP) in the other direction to compensate for this desirable functionality.

Most firewalls act as gatekeepers for networks or network segments and manage ingress and egress of data at a network boundary (e.g., a boundary between a corporate local network and the internet). In fact, if the feature set has been enabled, a router can easily be considered to be a firewall for security purposes if the router does filtering of traffic on the network. As a gatekeeper for the network, the router can carefully filter undesirable traffic that attempts to enter the network.

Although firewalls (e.g., edge routers) typically protect the network from incoming traffic, firewalls can also prevent particular traffic from leaving the network. By using tags, the firewall can restrict particular internal packets from exiting the network and/or from going to certain parts of the network. Such a feature is part of egress filtering, which can be just as important as the ingress filtering.

For added security, a network administrator can use tags to employ Access Control Lists (ACLs) as the basic network access rule on all firewalls (e.g., edge routers) in both directions, so all network traffic incoming or outgoing needs approval. This implementation takes some commitment to keep functional. However, the implementation is highly secure.

Method Overview

Figure 5:
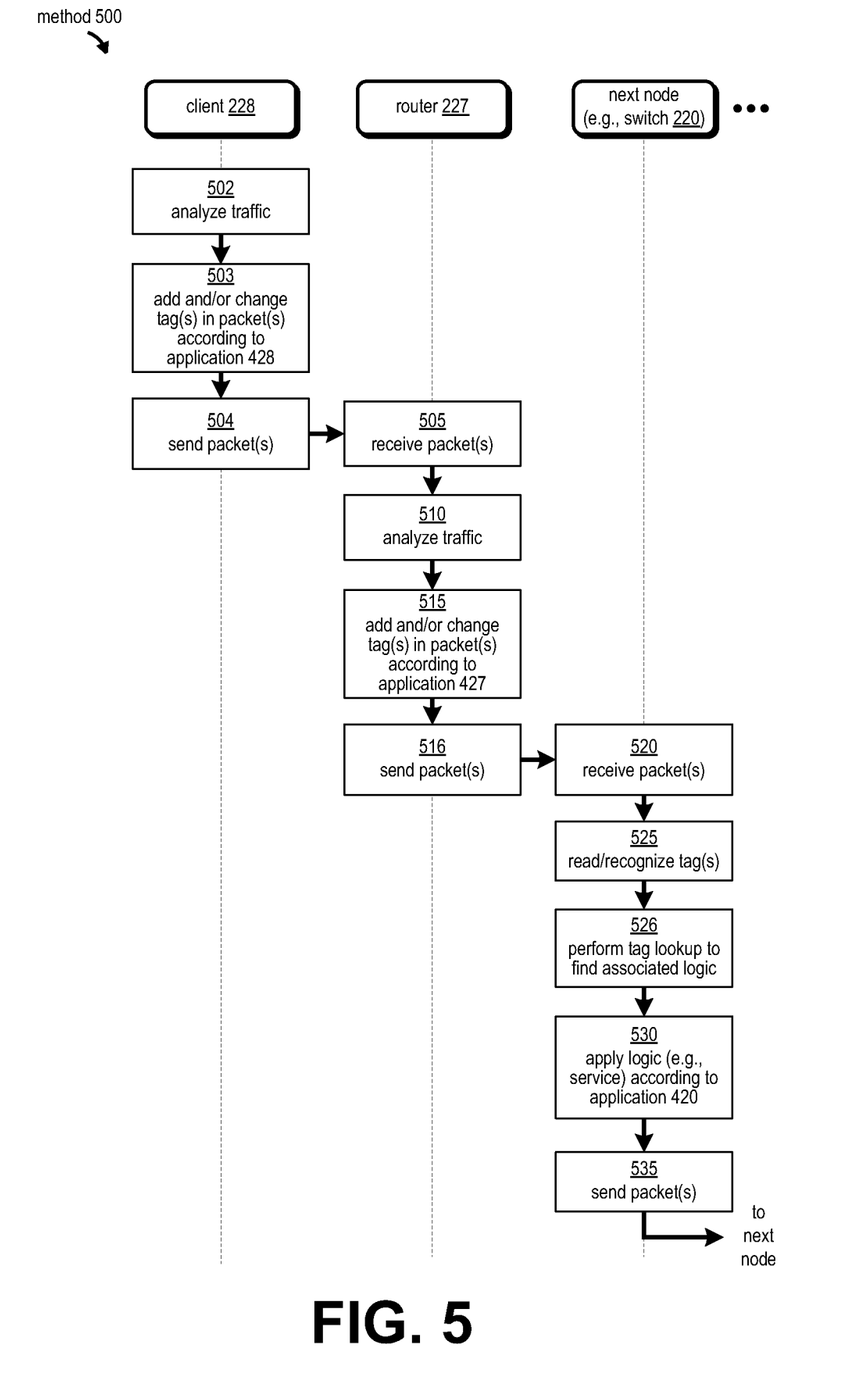
FIG. 5 illustrates an example method for extended tag networking, according to one embodiment.

FIG. 5 illustrates an example method 500 for extended tag networking, according to one embodiment. In one implementation, the context of the method 500 is a stream of traffic that is being transmitted from a client device (e.g., client 228 of FIG. 2) to a server (e.g., blade server 236 of FIG. 2). The stream of traffic is transmitted by using one or more data packets that flow through network devices (e.g., routers, switches, etc.) get from the client to the server. The network devices are preconfigured to handle tags, as described above with reference to FIG. 4.

At step 502, the client 228 analyzes the network traffic received at step 505. For example, the client 228 may have packets (e.g., Skype™ packets) that are intended to be sent to the network. The SDN application 428 instructs the client 228 to send an inquiry to the network to determine if the network is configured for handling a particular tag.

At step 503, the client 228 adds and/or changes a tag in the packet (e.g., data field of packet), as needed, according to instructions of the configured application 428. As described above with reference to FIG. 4, in one implementation, the application 428 is an SDN application that instructs the client 428 to analyze traffic (or each packet) and to add/change a tag in each packet, as necessary. At step 504, the client 228 sends the packet to the router 227.

At step 505, the router 227 receives a packet. In one implementation, the router 227 is an edge router that is located about as close as possible to the edge of the network.

At step 510, the router 227 analyzes the network traffic received at step 505. The SDN application 227 instructs the router 227 to inspect the network traffic to identify a pattern among particular packets and thereby determine those packets belong to a particular traffic flow. If tags are previously added to one or more packets of the traffic flow (e.g., due to the client 228 adding the tags), then the analysis carried out by the router 227 involves searching for and finding those added tags in the one or more packets.

At step 515, the router 227 adds and/or changes a tag in the packet (e.g., data field of packet) according to instructions of the configured application 427. As described above with reference to FIG. 4, in one implementation, the application 427 is an SDN application that instructs the router 227 to analyze traffic (or each packet) and to add/change a tag in each packet, as necessary.

At step 516, the router 227 sends the packet to the next network device (e.g., router, switch, etc.). For example, the router 227 can send the packet to switch 220.

At step 520, the next node (in this case, switch 220) receives the packet. For example, the switch 220 is a node that is located along the transmission path of the packet.

At step 525, the switch 220 reads the tag in the packet. For example, the switch 220 can read the packet data and thereby read the tag that is located among the packet data.

At step 526, the switch 220 performs a tag lookup to find logic (e.g., program code, instructions, etc.) associated with the tag. For example, the switch 220 is preconfigured with an application (e.g., application 420 of FIG. 4) that includes instructions to be carried out in response to the switch 220 identifying the tag.

At step 530, the switch 220 applies logic (e.g., instructions for carrying out a network service) according to an application (e.g., application 420 of FIG. 4). As one of many examples, the switch 220 may carry out security operations in response to performing the tag lookup.

At step 535, the switch 220 sends the packet to the next node. For example, the next node may perform steps that are similar to the steps performed by the switch 220. The method 500 continues with successive next nodes along the transmission path of the packet.

These methods may include other steps and/or details that are not discussed in this method overview. Other steps and/or details described herein may be a part of the methods, depending on the implementation. Persons skilled in the art will understand that any system configured to implement the method steps, in any order, falls within the scope of the present invention.

Example Architecture of a Network Device

Figure 6:
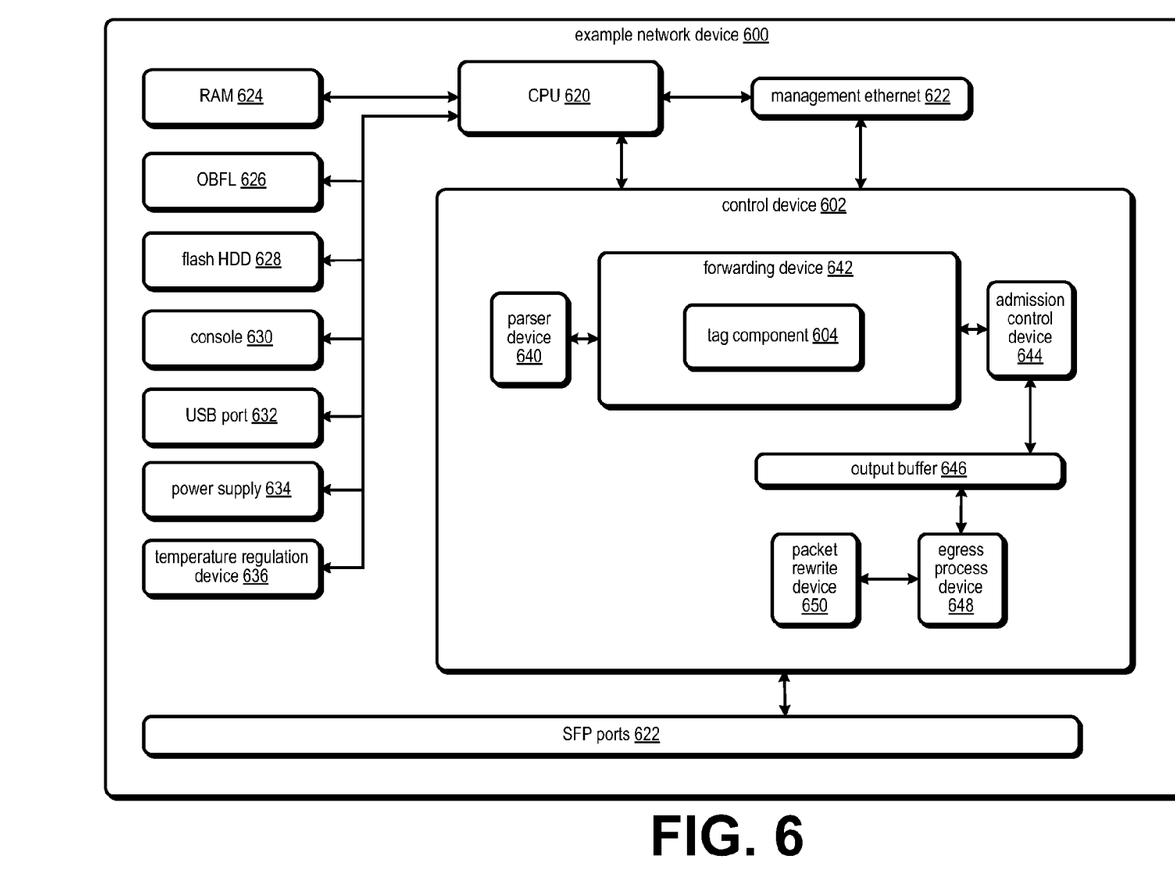
FIG. 6 illustrates example architecture of a network device, according to one embodiment.

FIG. 6 illustrates example architecture of a network device 600, according to one embodiment. Illustratively, the network device 600 includes a control device 602 coupled to a central processing unit (CPU) 620, management Ethernet 622, and small form-factor pluggable (SFP) ports 622 (e.g., Ethernet ports). The CPU 620 is coupled to random access memory (RAM) 624, onboard failure logging (OBFL) 626, flash hard disk drive (HDD) 628, a console 630, a USB port 632, a power supply 634, and a temperature regulation device 636. The components of the network device 600 are provided for explanatory purposes. A person skilled in the art can configure the network device 600 in many other ways.

The CPU 620 can receive traffic that the CPU 620 does not know how to handle, can resolve the uncertainty internally, and/or can request for help from another network device and receive the help from whatever network device can provide the help.

The control device 602 includes a parser 640, a forwarding device 642, an admission control device 644, an output buffer 646, an egress process device, and a packet rewrite device 650. The forwarding device includes a tag component 604, which is configured to carry out tagging operation, as discussed above with reference to FIGS. 4 and 5. In some embodiments, the control device 602 is an application specific integrated circuit (ASIC). The control device 602 is responsible for many of the switch features, such as VLAN assignment, Layer 3 table lookups, Layer 6 table lookups, buffer allocation, and time stamping. In particular, for layer 3 traffic the control device 602 is responsible for the packet-forwarding decisions.

The parser device 640 parses incoming packets, extracts fields (e.g., headers, trailers, data, etc.) required to determine whether a given packet should be forwarded. A packet is a basic unit of communication over a digital network. A packet may also be called a datagram, a segment, a block, a cell or a frame, depending on the protocol. When data is transmitted, a network device breaks down the data into similar data structures (packets). A destination computer reassembles the original data chunk once the packets reach a destination. Packets that may be lost somewhere along the transmission path are handled by higher layer protocols (e.g., TCP). The packet header typically identifies a protocol that specifies how the network device 600 should handle the packet. The protocol may be in a header of a packet. The parser device 640 then passes the parsed information to Layer 3 and/or Layer 6 lookup devices. The packet data itself may include a tag, as described above with reference to FIG. 1.

Next, the control device 600 sends the packet to the forwarding device 642 for a learning phase. One function of the forwarding device 642 is to acquire the tag that defines the manner in which the network device 600 is supposed to handle the packet.

In some implementations, the forwarding device 642 also learns the source Media Access Control (MAC) address in the hardware for the given virtual local area network (VLAN). Then, depending on the destination MAC address lookup result, the control device 602 forwards the packet to an external lookup device 609 (e.g., a Layer 6 processing device), the CPU 620, and/or all network devices of a particular VLAN. For Layer 6, the packet arrives at the external lookup device 609, and the source IP address is looked up in the Layer 6 table. The external lookup device 609 looks up and indexes the destination IP address in a next-hop table, which lists the outgoing interface of the network device 600 and the destination MAC address. The outgoing interface provides an index in the Layer 6 interface table that supplies the source MAC address and the VLAN. Other lookup operations, such as access control list (ACL) and network address translation (NAT) are also performed at this level. (The packet rewrite device 650 later uses this information to rewrite the packet after the packet has been parsed.) The operations of the forwarding device 642 can be performed in the hardware of the control device 602 without placing undue load on the CPU 620.

The forwarding device 642 passes the packet to the admission control device 644. The queuing, replication and Data Center Transmission Control Protocol (DCTCP) processes occur at the admission control device 644. Depending on the amount of shared buffer space available, the control device 602 stores the packet in a reserved per-port location, the reserved per-queue location, or the dynamic shared space. All these spaces are part of a shared buffer. Then the control device 602 sends the packets to a queue for scheduling. The control device 602 makes a decision for packet replication at the output buffer 646. The replication occurs at the egress process device 648, as the control device 602 places the packets in queues for scheduling. The replication process does not replicate the packet. Instead, the control device 602 manages the packet by using a pointer in memory. During the packet rewrite process, the control device 602 generates a different header on each outgoing interface. A result is similar latency times across all the outgoing interfaces that are sending the same data.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

What is claimed is:

1. A computer-implemented method for carrying out tag networking on a network, the method comprising:
    analyzing, by a first network device, a pattern of a traffic flow including a plurality of packets received by the first network device to determine a traffic type associated with the packets, wherein the analysis further determines, based on the pattern of the traffic flow, whether one or more network devices is configured to handle a specified application-based service; and
    upon determining, based on the analysis, that the one or more network devices is configured to handle the specified service, adding a tag to a data field of each packet associated with the traffic flow, wherein the tag identifies the traffic type, and wherein the tag is identifiable by the one or more network devices configured to forward the packets toward a destination and to execute an application based on the tag in response to recognizing the tag.

2. The method of claim 1, wherein the packets are received by an edge router.

3. The method of claim 1, wherein the tag further identifies an application associated with the traffic flow.

4. The method of claim 1, wherein analyzing the traffic is performed by an application executing on the first network device.

5. The method of claim 4, wherein the application selects a tag to assign to packets of the traffic flow based on the analysis of the pattern of the packet flow.

6. The method of claim 5, wherein the application is installed on a router using a single platform kit for the network, wherein the single platform kit includes a set of tools configured to push applications to the network devices, wherein the applications include instructions for the network devices to process traffic flows according to tags assigned to packets of the traffic flows.

7. The method of claim 5, further comprising, updating the application loaded on a router.

8. The method of claim 1, further comprising, changing the tag assigned to packets associated with the traffic flow to a second tag, wherein the second tag is identifiable by the one or more network devices when processing packets of the traffic flow assigned the second tag.

9. The method of claim 1, further comprising, removing the tag from packets associated with the traffic flow before packets associated with the traffic flow exit a network boundary associated with a software defined network.

10. One or more non-transitory computer-readable storage media storing instructions for carrying out tag networking on a network, wherein the instructions, when executed, direct the one or more processors to perform steps comprising:
    analyzing, by a first network device, a pattern of a traffic flow including a plurality of packets received by the first network device to determine a traffic type associated with the packets, wherein the analysis further determines, based on the pattern of the traffic flow, whether one or more network devices is configured to handle a specified application-based service; and
    upon determining, based on the analysis, that the one or more network devices is configured to handle the specified service, adding a tag to each packet associated with the traffic flow, wherein the tag identifies the traffic type, and wherein the tag is identifiable by one or more network devices configured to forward the packets toward a destination and to perform predefined logic in response to recognizing the tag.

11. The one or more computer-readable storage media of claim 10, wherein the packets are received by an edge router.

* * * * *